United States Patent Office.

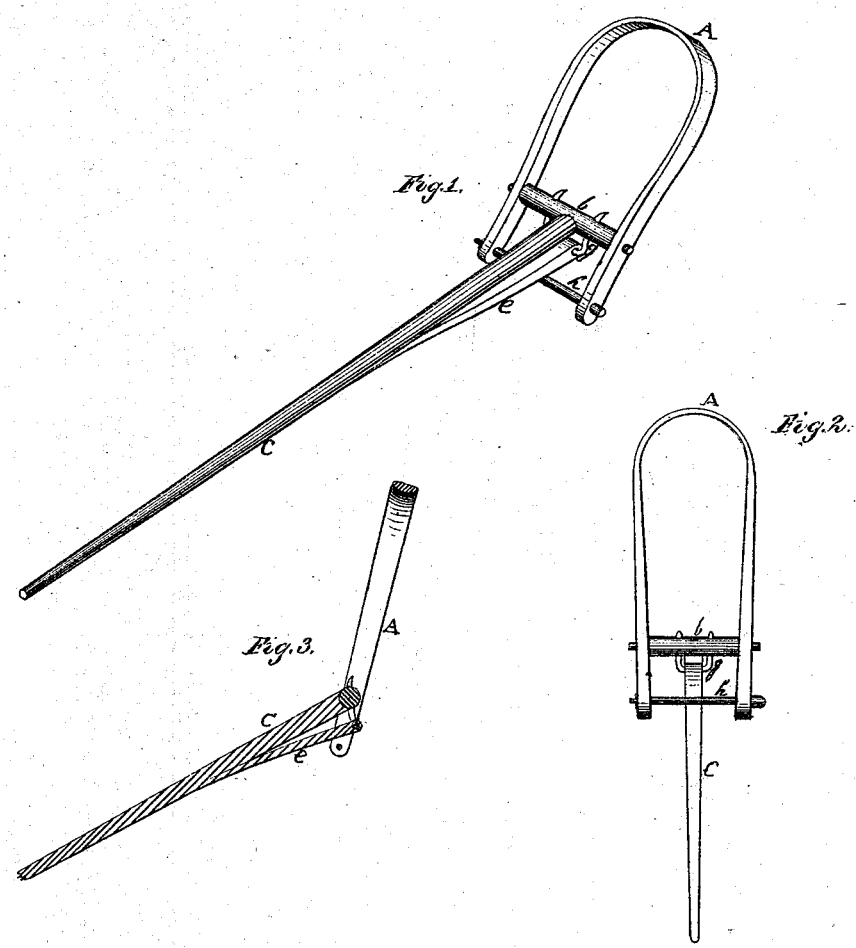

WILLIAM KELLY, OF SARANAC, MICHIGAN.

Letters Patent No. 105,579, dated July 19, 1870.

IMPROVEMENT IN ANIMAL POKES.

The Schedule referred to in these Letters Patent and making part of the same.

*To all whom it may concern:*

Be it known that I, WILLIAM KELLY, of Saranac, in the county of Ionia and State of Michigan, have invented certain new and useful Improvements in Animal Pokes; and I do hereby declare that the following is a full, clear, and exact description thereof, reference being had to the accompanying drawings and to the letters of reference marked thereon, which form a part of this specification, in which—

Figure 1 is a perspective of my invention.

Figure 2 is a rear view of the same.

Figure 3 represents a vertical section of yoke, bar, and spring.

The nature of this invention consists simply in an improved arrangement of device, patented by me June 22, 1869.

A in the annexed drawings represents the yoke.

$b$ designates a roller, pivoted in the sides of yoke A.

C is a bar, the upper end of which is permanently secured to the center of roller $b$.

$e$ represents a spring, the outer end of which is fastened to the lower side of bar C, while the inner end extends a little beyond the roller $b$.

Through the inner end of spring $e$ the staple $g$ is inserted, the said staple being made to pass through bar $b$, and playing loosely in the holes through which it passes.

At a suitable distance beneath roller $b$ is placed the rod $h$, the ends of which are fastened in the opposite sides of yoke A. The object of rod $h$ is to afford a fulcrum for spring $e$.

The bar C, it will be seen, extends from yoke A at an angle of about forty-five degrees, so that the outer end of said bar will come in contact with a fence before the head of the animal is near enough to disturb the rails.

The moment a downward pressure is exerted on the outer end of bar C, the upward movement of spring $e$ will force the staple $g$ in the same direction, and the pointed ends of the staple will prick the animal's neck, and compel him to withdraw from the fence.

Having thus described my invention,

What I claim, and desire to secure by Letters Patent, is—

The arrangement of yoke A, rod $h$, bar $e$, staple $g$, and roller $b$, substantially as herein shown and described.

In testimony that I claim the foregoing as my own I affix my signature in presence of two witnesses.

WILLIAM KELLY.

Witnesses:
CHARLES L. WILSON,
WILLIAM MERCER.